United States Patent
Vila et al.

(10) Patent No.: US 7,424,075 B2
(45) Date of Patent: Sep. 9, 2008

(54) PSEUDORANDOM DATA PATTERN VERIFIER WITH AUTOMATIC SYNCHRONIZATION

(75) Inventors: Diego F. Vila, Austin, TX (US); Marcus S. Mateus, Houston, TX (US)

(73) Assignee: Crossroads Systems, Inc., Austin, TX (US)

( * ) Notice: Subject to any disclaimer, the term of this patent is extended or adjusted under 35 U.S.C. 154(b) by 609 days.

(21) Appl. No.: 10/631,173

(22) Filed: Jul. 31, 2003

(65) Prior Publication Data

US 2005/0025191 A1 Feb. 3, 2005

(51) Int. Cl.
*H04L 7/00* (2006.01)

(52) U.S. Cl. ...................................... 375/354
(58) Field of Classification Search ................. 375/365, 375/369, 368, 354
See application file for complete search history.

(56) References Cited

U.S. PATENT DOCUMENTS

| | | | |
|---|---|---|---|
| 3,916,379 A * | 10/1975 | Dulaney et al. | ............. 714/704 |
| 4,543,657 A * | 9/1985 | Wilkinson | .................. 375/367 |
| 4,791,653 A | 12/1988 | McFarland et al. | |
| 4,827,514 A | 5/1989 | Ziolko et al. | |
| 4,855,735 A * | 8/1989 | Webb et al. | ............ 340/870.14 |
| 4,974,184 A | 11/1990 | Avra | |
| 5,228,042 A | 7/1993 | Gauthier et al. | |
| 5,237,593 A | 8/1993 | Fisher et al. | |
| 5,528,635 A | 6/1996 | Negi | |
| 5,727,018 A | 3/1998 | Wolf et al. | |
| 5,754,603 A | 5/1998 | Thomas et al. | |
| 5,867,409 A * | 2/1999 | Nozuyama | ................... 708/252 |
| 6,240,432 B1 | 5/2001 | Chuang et al. | |
| 6,263,082 B1 | 7/2001 | Ishimoto et al. | |
| 2003/0046636 A1 * | 3/2003 | Kanasugi et al. | ............ 714/781 |

OTHER PUBLICATIONS

International Search Report and Written Opinion PCT/US04/24496, Nov. 18, 2005.

* cited by examiner

*Primary Examiner*—Khai Tran
(74) *Attorney, Agent, or Firm*—Sprinkle IP Law Group (57) ABSTRACT

Systems and methods for synchronizing digital communications links, wherein one embodiment implemented in a receiver of a communications link comprises a shift register coupled to a transmission medium to receive synchronization data and a feedback circuit coupled to the shift register, wherein one or more cells of the shift register are configured to alternatively accept as input either a bit from a preceding cell or a received bit of synchronization data. The first occurs prior to synchronization, while the second occurs after synchronization. A counter is used to assert a signal indicating that the transmitter and receiver are synchronized.

5 Claims, 5 Drawing Sheets

PSEUDORANDOM DATA PATTERN VERIFIER WITH AUTOMATIC SYNCHRONIZATION

FIELD OF THE INVENTION

The invention relates generally to communications links and more particularly to systems and methods for synchronizing these links and performing real-time testing of transmissions over the links to determine corresponding bit error rates.

BACKGROUND OF THE INVENTION

Digital communications links are often used to transmit data at very high rates from one point to another. The transmission of the data over these communications links, however, may introduce errors into the data. These errors may arise from a number of sources.

For example, because the transmission medium of the link may have several closely spaced data lines carrying high frequency signals, the signals may be subject to noise generated by electromagnetic interference. This noise may degrade the signal enough to cause errors in the data.

As a result of the potential for introducing errors into the data, various means are used to test the integrity of these communications links. One such means is the transmission of a known data pattern over the link and comparing the transmitted data to the known data pattern to identify errors. Because a predetermined, non-random pattern may not closely approximate the different conditions present in actual data transmissions (e.g., conditions relating to the frequency spectrum of the transmissions), it is usually better to use a random, or pseudorandom bit sequence to test the link. These bit sequences may be compared after transmission to sequences identically generated on the receiving end of the link. This requires that the sequence generator on the receiving end of the link generate the same pseudorandom bit sequence, and do so in synchronization with the received pseudorandom bit sequence.

There are a several ways in which the synchronization of the receiver's pseudorandom bit sequence might be accomplished. For instance, the received pseudorandom bit sequence can be examined to determine when a predetermined sequence appears in the bit sequence. When the predetermined sequence is found, the two sequences are synchronized. It is typically inefficient, however, to wait for the predetermined sequence to appear. Another way to synchronize the pseudorandom bit sequences would be to receive a first portion of the transmitted bit sequence and to look up this sequence in a table to determine where the transmitter is in a certain bit sequence. This, however, would also be inefficient.

It would therefore be desirable to provide a mechanism for quickly and efficiently synchronizing two pseudorandom bit sequences in a communications link. It would further be desirable for this mechanism to enable the testing of the bit error rate in real-time (i.e., during data transmissions).

SUMMARY OF THE INVENTION

One or more of the problems outlined above may be solved by the various embodiments of the invention. Broadly speaking, the invention comprises systems and methods for synchronizing a communications link.

One embodiment of a system in accordance with the present disclosure is a system implemented in a receiver of a communications link comprising a receiver shift register coupled to a transmission medium to receive synchronization data and a feedback circuit coupled to the receiver shift register, wherein one or more cells of the receiver shift register are configured to alternatively accept as input either a bit from a preceding cell or a received bit of synchronization data. In other words, synchronization data received via the communications link may be input to the cells of the shift register, or the shift register may simply shift data from one cell to the next. The first occurs prior to synchronization, while the second occurs after synchronization. The first cell (corresponding to the least significant bit) receives input from the combinatorial output of two or more cells of the receiver's shift register via the feedback circuit (this is an exclusive OR gate in the case of the linear feedback shift register).

One embodiment of a method in accordance with the present disclosure is implemented in a receiver of a communications link. The method comprises receiving one or more bits of synchronization data in a receiver of a communications link and loading the one or more bits of synchronization data into a shift register in the receiver, wherein the receiver shift register has a feedback circuit. Then, if the receiver shift register is filled with synchronization data, synchronized operation of the receiver shift register with a corresponding transmitter shift register is initiated. ("Synchronized operation," as used here, refers to the normal transmission of data over the communications link while the shift registers of the transmitter and receiver are generating identical bit sequences that can be compared.) If the receiver shift register is not filled with synchronization data, the loaded synchronization data is shifted and one or more additional bits of synchronization data are loaded into the receiver shift register.

Numerous alternative embodiments are also possible.

The various embodiments of the systems and methods described above may provide a number of advantages over other systems. For example, the receiving end of a communications link can be synchronized more quickly than systems which look for predetermined patterns in received bit sequences, or which look up received bit patterns in a corresponding table. The bit error rate of a communications link can also be determined in real-time by transmitting portions of a pseudorandom bit sequence in idle codes contained in normal data transmissions. These bit sequences can be compared with locally generated sequences to identify bit errors that occur during transmission. Users may therefore be able to continually monitor the integrity of the communications link and repair or replace it if necessary. The present systems and methods may also be beneficial in that they can be implemented with only minimal additions to the existing hardware logic, and no additional data overhead.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for synchronizing a communications link. The synchronization mechanism further enables the determination of error rates of data transmissions over the communications link. In one embodiment, the transmitter and receiver of the communications link each contains a linear feedback shift register. Both linear feedback shift registers use the same polynomial to generate a pseudorandom bit sequence. The linear feedback shift register in the transmitter is initialized with a first bit sequence. At least a portion of this first bit sequence is transmitted over the communications link in an idle code and is used to initialize the shift register in the receiver. After a predetermined number of idle codes has been received, the communications link is synchronized, and normal data transmissions may commence. Link integrity checking may also take place before data transmission. Idle codes which are transmitted as part of the normal data stream contain one or more bits from the transmitter's shift register. These bits are compared in the receiver to corresponding bit generated by the receiver's shift register. The errors identified through the comparison of these bits can then be used to determine the bit error rate of the communications link in real-time (i.e., during, or intermittently with, normal data transmissions).

It should be noted that the term "idle code" is used herein to refer to any type of fill word that may be inserted into a data stream between actual data transmissions. Although the term "idle code" is used in connection with the Infiniband protocol, the use of this term should not be limited to this protocol, but should instead be broadly construed.

The present systems and methods are intended to be implemented in digital communications links to provide a means to initialize and verify the integrity of the links. The present systems and methods enable synchronization of the communications link with minimal processing and also enable real-time computation of a bit error rate associated with the communications link without adding to the overhead of the data transmissions over the link.

Figure 1:
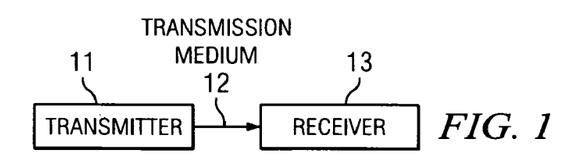
FIG. 1 is a diagram illustrating the communication of data over a communications link.

Referring to FIG. 1, a diagram illustrating the communication of data over a communications link is shown. In the communications link depicted in the figure, a transmitter 11 is coupled via transmission medium 12 to a receiver 13. Upon the occurrence of a reset event, data transmissions between transmitter 11 and receiver 13 are interrupted (if they were not already disrupted) and each is reset. When transmitter 11 and receiver 13 come out of the reset condition, they are not synchronized with each other. Consequently, they must perform a series of start-up procedures before they are able to resume data transmissions. These start-up procedures include steps for initialization of the transmitter and receiver themselves and the synchronization of data transmissions between them.

It should be noted that, while a single transmitter and a single receiver are depicted in FIG. 1, communications links typically have a transmitter and a receiver at each end, so that they are capable of full duplex data transmissions. Consequently, descriptions herein of individual transmitters and receivers may be considered to correspond to one-half of such a communications link and may be extended to such a link.

It is desired for the communications link to transmit some type of data that can be used to synchronize the communications link. It is also desired to transmit some type of data, subsequent to initialization of the link, that can be used to test the error rate of data transmissions over the link. Each of transmitter 11 and receiver 13 therefore includes a mechanism for performing each of these functions. This mechanism employs a bit sequence generator (e.g., a pseudorandom number generator) in the transmitter and a similar one in the receiver. The bit sequence generated by transmitter 11 is transmitted to receiver 13 to synchronize the communications link and to thereafter use in comparing the bit sequences to determine the error rate of the link. It should be noted that the number generator (which can also be referred to as a bit sequence generator) need not be limited to pseudorandom sequences, although they are preferred.

In a preferred embodiment, the transmitter and receiver each employs a linear feedback shift register to generate a pseudorandom bit sequence. Each linear feedback shift register is identically configured. That is, each linear feedback shift register has the same number of bits in the register and uses the same polynomial to generate feedback for the register. Thus, based on the same initial bit sequence, the two linear feedback shift registers will generate the same sequence of pseudorandom bits. The pseudorandom bit sequence generated by the receiver linear feedback shift register can be compared to the bit sequence received from the transmitter linear feedback shift register to determine the rate at which errors are introduced into the transmitted data.

The linear feedback shift register of the transmitter is initialized with a set of bits that fills the shift register. The particular set of bits that is used is not important, except that in some embodiments, they should not be all ones or all zeros. Into a linear feedback shift register that uses an exclusive OR gate with an even number of inputs for feedback, having zeros in all of the cells of the shift register is not allowed. If the exclusive OR gate has an odd number of inputs, having ones in all of the cells of the shift register is not allowed.

In the preferred embodiment, the cells or flip-flops of the shift register are not actually loaded with any particular data, but instead simply hold whatever values are in them when they come out of reset. The bits in the transmitter linear feedback shift register, or a portion of these bits, are transmitted to the receiver linear feedback shift register. The transmitted portion of the bits should be consecutive. When the bits are received, they are loaded into the receiver's linear feedback shift register. If the bits comprise only a portion of the bits in the transmitter's linear feedback shift register, this process is repeated for a number of cycles to allow valid bits to shift into each flip-flop of the shift register. When the receiver's linear feedback shift register is entirely filled with valid bits, the link is synchronized, and normal data transmissions may begin.

Figure 2A:
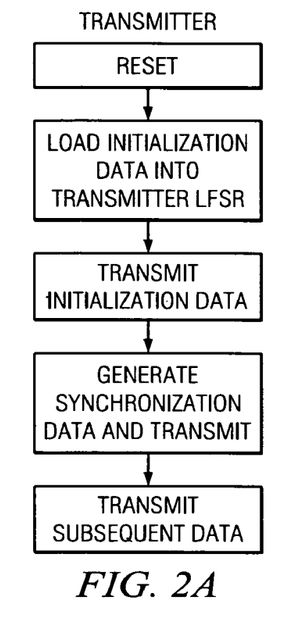
FIGS. 2A and 2B are flow diagrams illustrating the operation of the transmitter and receiver of a communications link in one embodiment.
Figure 2B:
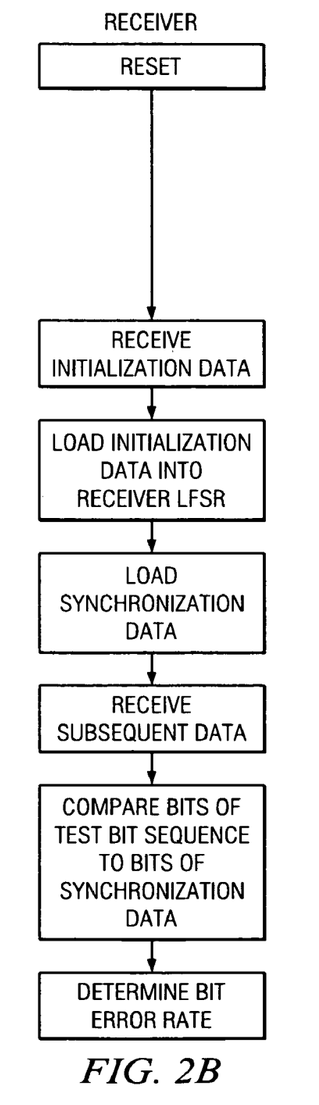

The operation of the transmitter and receiver are summarized in the flow diagram of FIGS. 2A and 2B. FIG. 2A shows the actions performed by the transmitter. These actions include, after reset, loading initialization data into the linear feedback shift register, transmitting the initialization data (or a portion thereof) to the receiver, generating synchronization data and transmitting it to the receiver, and then transmitting subsequent data (including "useful" data and synchronization data) to the receiver.

It should be noted that the term "initialization data" does not refer to a single, predetermined piece of data, but is instead intended to refer to any data that can be used to initialize the receiver's shift register. For example, if the bit sequence taken from the transmitter shift register is loaded into the receiver shift register at a higher position (e.g., if the data is taken starting from flip-flop n and is loaded starting at flip-flop n+1), the bits initially loaded into the transmitter shift register will not be used to initialize the receiver shift register. Instead, some of the synchronization data generated by the transmitter linear feedback shift register will be used to initialize the receiver shift register.

FIG. 2B shows the actions performed by the receiver. These actions include receiving the initialization data (or subsequent synchronization data) from the transmitter, loading this data into the linear feedback shift register of the receiver, receiving subsequent data (including "useful" data and synchronization data), comparing bits of the receiver-generated pseudorandom bit sequence to the synchronization data received with the useful data, and determining a bit error rate from the number of errors in the received synchronization data.

Before the operation of the system is described in more detail, it will be helpful to describe the hardware in which a preferred embodiment is implemented.

Figure 3:
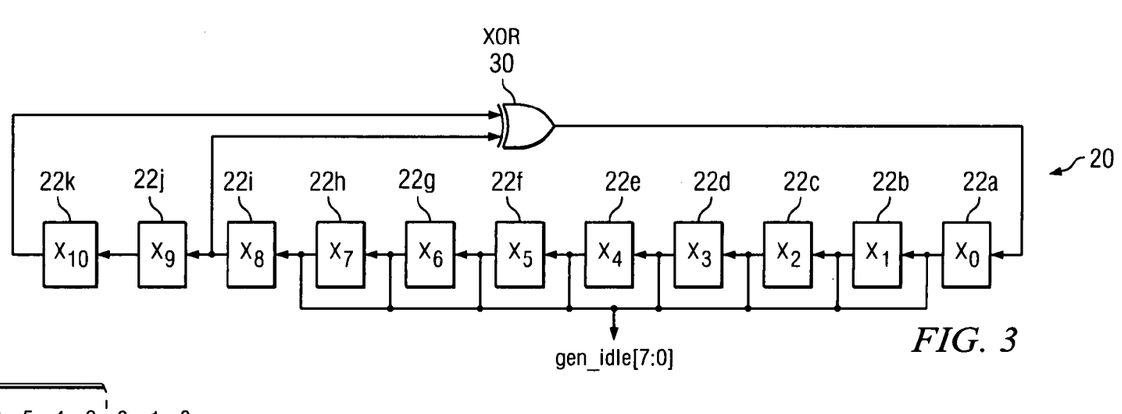
FIG. 3 is a diagram illustrating the linear feedback shift register used in the transmitter of the communications link in one embodiment.
Figure 4:
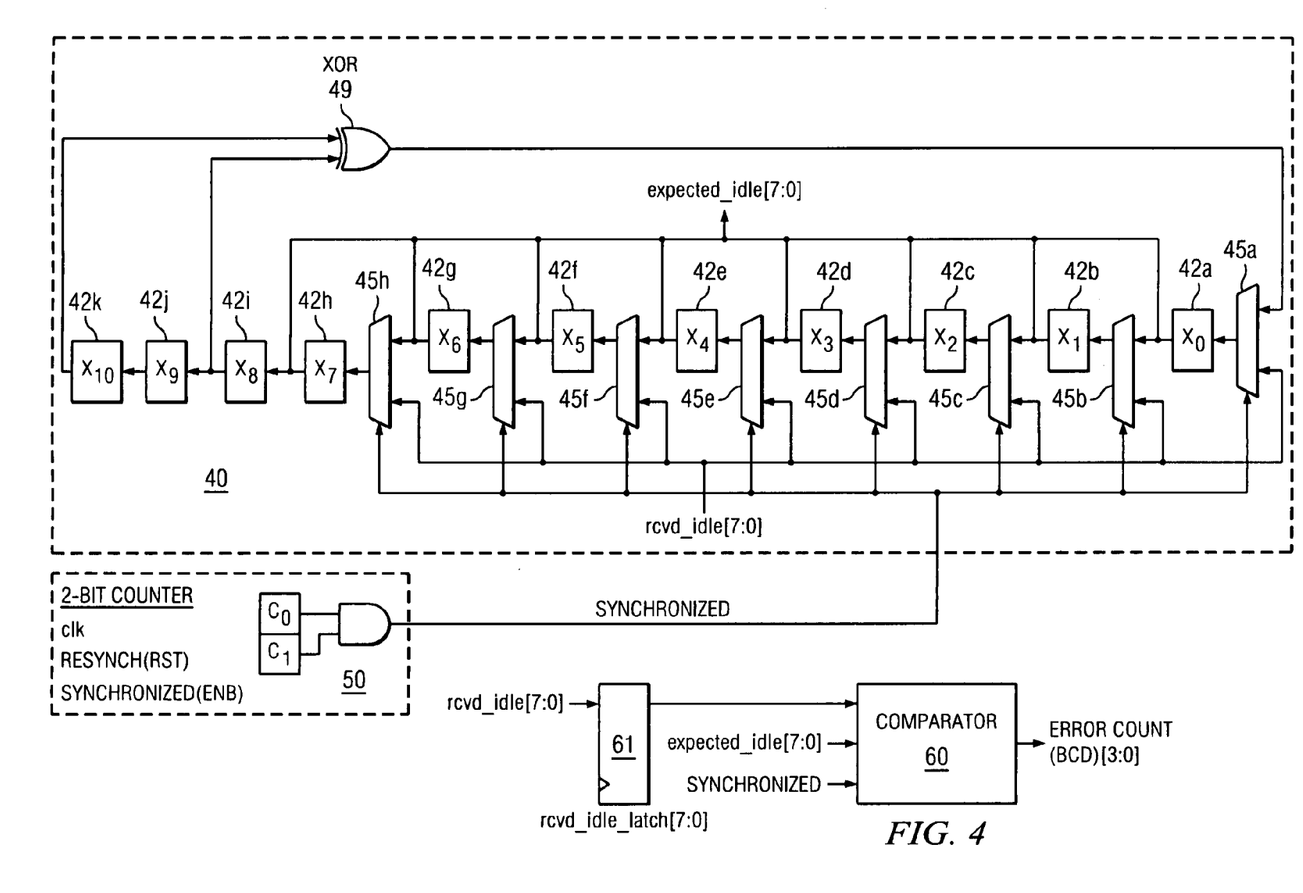
FIG. 4 is a diagram illustrating the linear feedback shift register, counter and comparator used in the receiver of the communications link in one embodiment.

FIGS. 3 and 4 depict the transmitter-end and receiver-end components, respectively, of a synchronization system according to one embodiment of the present invention. This particular embodiment is designed to be implemented in accordance with the Infiniband protocol, which specifies the use of a pseudorandom bit sequence generated upon the basis of an 11th order polynomial.

Referring to FIG. 3, the linear feedback shift register used in the transmitter of the communications link in this embodiment is shown. It can be seen from the figure that the linear feedback shift register design is a very simple one. It consists of eleven serially connected flip-flops $22a$-$22k$ and an exclusive OR (XOR) gate 30 which provides feedback that is shifted into the first flip-flop $22a$ on each clock cycle. The inputs to exclusive OR gate 30 are connected to the outputs of flip-flops $22i$ and $22k$. This corresponds to a polynomial of $x^{11}+x^9+1$. A more detailed discussion of the use of polynomials in the generation of feedback is discussed in such reference books as Error Control Systems by Stephen Wicker (Prentice-Hall, 1995).

Referring to FIG. 4, the linear feedback shift register used in the receiver of the communications link in this embodiment is shown. The linear feedback shift register used in the receiver is very similar to the linear feedback shift register used in the transmitter. The linear feedback shift register of the receiver, however, must perform the function of synchronizing the receiver with the transmitter (whereas the linear feedback shift register of the transmitter is only required to generate the pseudorandom bit sequence). Because the receiver is part of an Infiniband communications link, it must, of course, conform to applicable requirements of this protocol.

The pseudorandom bit sequence generator of the receiver generally comprises two components: linear feedback shift register 40; and counter 50. Once the pseudorandom bit sequence generator is synchronized with the pseudorandom bit sequence generator of the transmitter, the pseudorandom bit sequences generated and received by the receiver are compared by comparator 60 to determine whether errors are contained in this data. It should be noted that the received data should be latched for a cycle before being compared to the generated pseudorandom data. This function is performed by flip-flop 61. The input to the pseudorandom number generator, on the other hand, does not need to be latched.

As noted above, linear feedback shift register 40 of the receiver is very similar to that of the transmitter. The receiver linear feedback shift register contains eleven serially connected flip-flops, and the output of flip-flops $42k$ and $42i$ are connected to the inputs of exclusive OR gate 49, which generates feedback to be shifted into flip-flop $42a$. Thus, if flip-flops $42a$-$42k$ contain the same bits as flip-flops $22a$-$22k$, the same pseudorandom bit sequence will be generated. Since the purpose of linear feedback shift register 40 is to generate a pseudorandom bit sequence identical to that of the transmitter, it is necessary to implement a mechanism for synchronizing the shift registers.

The hardware mechanism which is implemented in linear feedback shift register 40 to load the contents of the transmitter's linear feedback shift register comprises a series of demultiplexers $45a$-$45h$. Demultiplexers $45a$-$45h$ are connected to the inputs of eight of the eleven flip-flops to allow the selection of either a corresponding bit from a received idle code or the output of the preceding flip-flop. In the case of flip-flop $42a$, demultiplexer $45a$ selects either the corresponding bit of the idle code or the output of exclusive OR gate 49. All of the demultiplexers' control inputs are coupled to receive a "synchronized" signal from counter 50.

This system is designed to function as follows. Upon reset, all of the data in flip-flops $42a$-$42k$ is invalid. Counter 50 is also cleared upon reset so that the "synchronized" signal is not asserted. (It may also be said that this signal is deasserted.) When the "synchronized" signal is not asserted, each of demultiplexers $45a$-$45h$ is configured to select the input from a received idle code.

Referring again to FIG. 3, the data in the idle codes is taken from the transmitter's shift register. As shown in this figure, the first (least significant eight bits of the sequence in the shift register are read from flip-flops $22a$-$22h$. An idle code having these eight bits is transmitted to the receiver. On the next cycle, the bits have been shifted to the left by one flip-flop, but the same flip-flops ($22a$-$22h$) are read to get the next idle code. This is the next idle code to be sent to the receiver. The transmitter shift register continues generating idle codes in this manner for transmission to the receiver.

Thus, the initial input to flip-flops $42a$-$42k$ after reset is the pseudorandom bit sequence contained in the idle codes received from the transmitter via the transmission medium. The pseudorandom bit sequence in the idle codes is taken from linear feedback shift register 20 of the transmitter. As long as the "synchronized" signal is not asserted, the pseudorandom bit sequence contained in the idle codes will be loaded into the receiver's flip-flops on each clock cycle. When the "synchronized" signal is asserted, demultiplexers $45a$-$45h$ will select the outputs of the preceding XOR gate (49) or flip-flops ($42a$-$42g$), and will load these values into flip-flops $42a$-$42h$.

Thus, linear feedback shift register 40 is configured, after reset, to load the pseudorandom bit sequence of the first idle code into flip-flops 42a-42h, then shift the value of flip-flop 42h into flip-flop 42i and load the pseudorandom bit sequence of the second idle code into flip-flops 42a-42h, and so on. This continues until each of flip-flops 42a-42k contains valid data (i.e., data identical to that which was stored in flip-flops 22a-22k in the linear feedback shift register 20 of the transmitter on the preceding cycle).

It can be seen that, operating in this manner, it will take four cycles to fill linear feedback shift register 40 with valid data. After one cycle, flip-flops 42a-42h will contain eight valid bits from the first received idle code. After another cycle, flip-flops 42a-42h will contain eight valid bits from the second received idle code, and flip-flop 42i will contain a valid bit shifted into it from flip-flop 42h. After the third cycle, flip-flops 42a-42j will contain valid data and, after the fourth cycle, flip-flops 42a-42k will all contain valid bits. At this point, linear feedback shift register 40 can generate valid feedback of its own and has no need for further input from the received idle codes.

It should be noted that, although the idle codes are extracted from the first eight flip-flops of the transmitter linear feedback shift register and loaded into the first eight flip-flops of the receiver linear feedback shift register in the system described above, they may be taken from and loaded into any eight consecutive flip-flops. For example, the idle codes could be taken from flip-flops 22a-22h and loaded into flip-flops 42d-42k, or they could be taken from flip-flops 22d-22k and loaded into flip-flops 42a-42h. Receiver linear feedback shift register 40 would still contain valid data after four cycles, and could proceed to generate the pseudorandom bit sequence on its own. (This would, of course, require that the circuit shown in FIG. 4 be modified to reposition the demultiplexers before the appropriate flip-flops).

It should also be noted that it is not necessary that the receiver linear feedback shift register be initialized with the same eleven bits as the transmitter linear feedback shift register. In fact, if the transmitter transmits the eight bits starting with the least significant bit, and the receiver loads the received bits into the eight flip-flops starting with the next higher significant bit, the receiver linear feedback shift register will not be initialized with the same eleven bits after synchronization. The receiver linear feedback shift register will, however, be initialized with some set of eleven bits with which the transmitter linear feedback shift register was previously loaded.

Figure 5A:
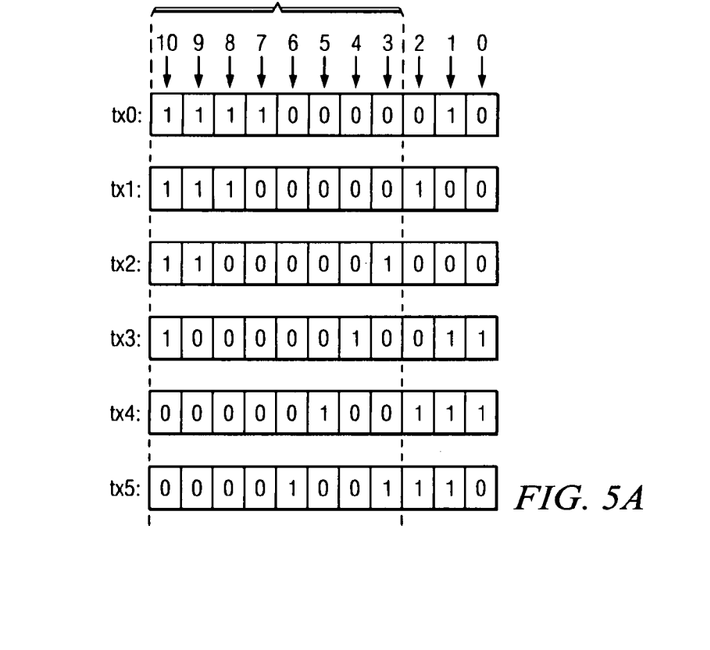
FIGS. 5A-5E are diagrams illustrating the state of the data in the cells of the transmitter and receiver shift registers in relation to the number of cycles since reset in one embodiment.
Figure 5B:
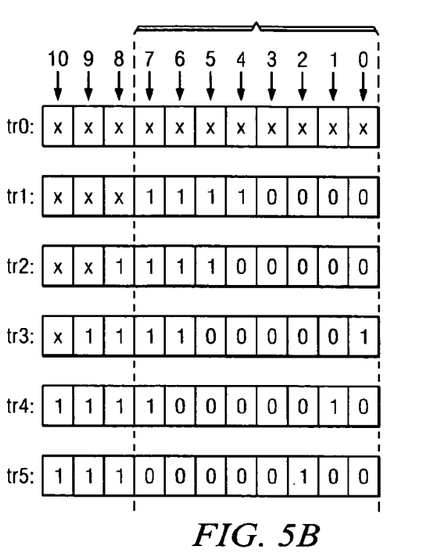
Figure 5C:
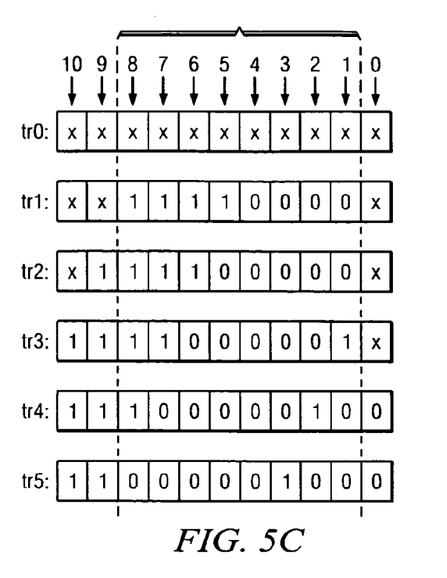

Referring to FIG. 5A, a diagram illustrating the data in the transmitter shift register is shown for one embodiment. In this embodiment, an 11-bit linear feedback shift register is used. The data is shown in relation to the number of cycles since reset ($t_{x0}$, $t_{x1}$, . . . ) The numbers at the top of the diagram indicate the flip-flop to which the indicated column of data corresponds, where 0 indicates the flip-flop containing the least significant bit and 10 indicates that flip-flop containing the most significant bit. In this embodiment, the bits in cells 3-10 are taken from the shift register and transmitted in idle codes to the receiver shift register. Although, in other embodiments, the data could be taken from a different subset of contiguous cells, the effect will be similar to that of inserting the data into different cells of the receiver shift register, so these embodiments will not be separately illustrated.

FIGS. 5B-5E illustrate the state of the data in flip-flops 42a-42k in relation to the number of cycles since reset ($t_{r0}$, $t_{r1}$, . . . ) Each of these figures illustrates the insertion of the idle code data extracted from cells 3-10 of the transmitter shift register into a different subset of the receiver shift register cells. FIGS. 5B-5E, respectively, illustrate the insertion of the data into cells 0-7, 1-8, 2-9 and 3-10. "$t_{r0}$" corresponds to the contents of the flip-flops upon reset, while "$t_{r1}$" through "$t_{r4}$" correspond to the contents of the flip-flops after one, two, three and four cycles, respectively. "x" in the figure indicates invalid data, while "1" or "0" indicates valid data.

Figure 5D:
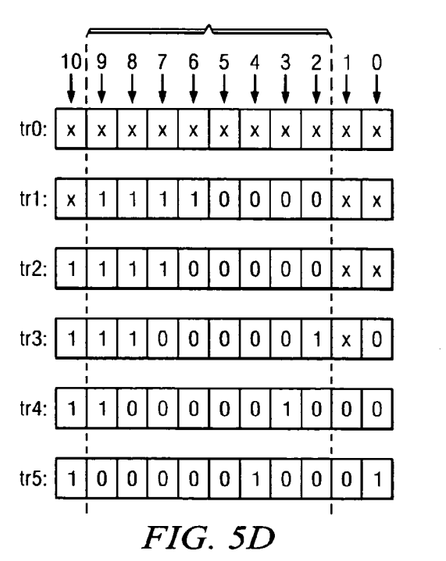
Figure 5E:
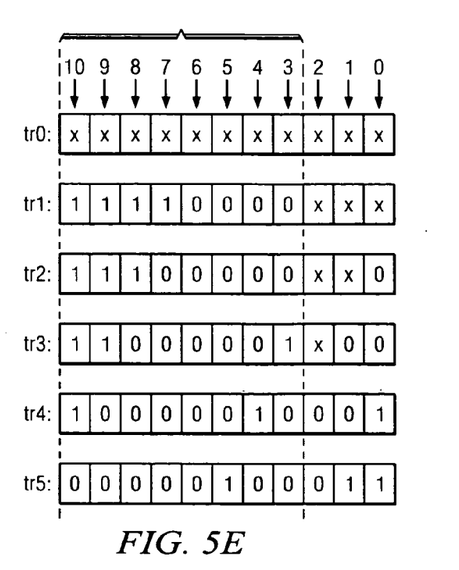

Referring to FIG. 5D as an example, all of the data in the flip-flops is considered to be invalid upon reset. After one cycle, eight bits received via the first received idle code are loaded into flip-flops 42b-42i (columns 1-8 in the figure). The data in the remaining flip-flops is still invalid. After another cycle (at t2), the contents of flip-flops 42b-42i are shifted into flip-flops 42c-42j (columns 2-9), then the contents of flip-flops 42b-42i (columns 1-8) are overwritten with the bit sequence contained in the second received idle code. Thus, at t2, nine of the eleven flip-flops contain valid data. After the next cycle (at t3), the contents of flip-flops 42b-42j (columns 1-9) are shifted into flip-flops 42c-42k (columns 2-10), then the contents of flip-flops 42b-42i (columns 1-8) are overwritten with the bit sequence contained in the third received idle code. Ten of the eleven flip-flops therefore have valid data. Finally, after the fourth cycle, all eleven of the flip-flops contain valid data. It should be noted that this would be true, regardless of which eight consecutive flip-flops are loaded with the idle code data.

Because the number of cycles required to fill linear feedback shift register 40 with valid data is known, counter 50 can be configured to assert the "synchronized" signal after this number of cycles. The assertion of this signal will cause demultiplexers 45a-45h to select the preceding flip-flops instead of the idle code data. Linear feedback shift register 40 will then begin to operate on its own and (i.e., it will be "free running") and will generate a pseudorandom bit sequence that is identical to and synchronized with that of the transmitter's linear feedback shift register. The "synchronized" signal will remain asserted until another reset event occurs.

The "synchronized" signal also enables comparator 60. While the linear feedback shift register is initializing, comparator 60 is disabled, because the presence of invalid data in one or more of flip-flops 42a-42k may cause an indication of errors when there are actually none. Accordingly, when the linear feedback shift register is initialized and can generate a pseudorandom bit sequence to match the pseudorandom bit sequence transmitted over the transmission medium (as indicated by the assertion of the "synchronized" signal), comparator 60 can begin making a valid comparison of the generated pseudorandom bit sequence and the received pseudorandom bit sequence.

Because the pseudorandom bit sequences generated on the transmitting and receiving ends of the communications link are identical, each mismatched bit (bit error) between the receiver's generated pseudorandom bit sequence and the received pseudorandom bit sequence must have been introduced during transmission. These bit errors are counted and used to determine a bit error rate (based on the total number of bits examined for errors).

It should be noted that the embodiment described above is optimized for implementation in a particular environment that utilizes the Infiniband protocol. Some of the characteristics of the system may change in other embodiments. For example, it may be necessary in other environments to use a higher or lower order polynomial, or even an altogether different method to generate the bit sequence for synchronization and/or comparison between the transmitting and receiving ends of a communications link. Even in an Infiniband-based link, there may be variations from the foregoing embodiment. One such variation might be the loading of more or fewer bits into the receiver's linear feedback shift register each cycle. For instance, it might be desirable to load six bits of the pseudorandom bit sequence into the shift register. The linear feedback shift register would still be synchronized, but it would take two cycles longer (i.e., six cycles instead of four) to do so. It should be noted that the number of cycles required to initialize the linear feedback shift register is the difference between the number of flip-flops in the shift register and the number of bits loaded, plus one.

Figure 6:
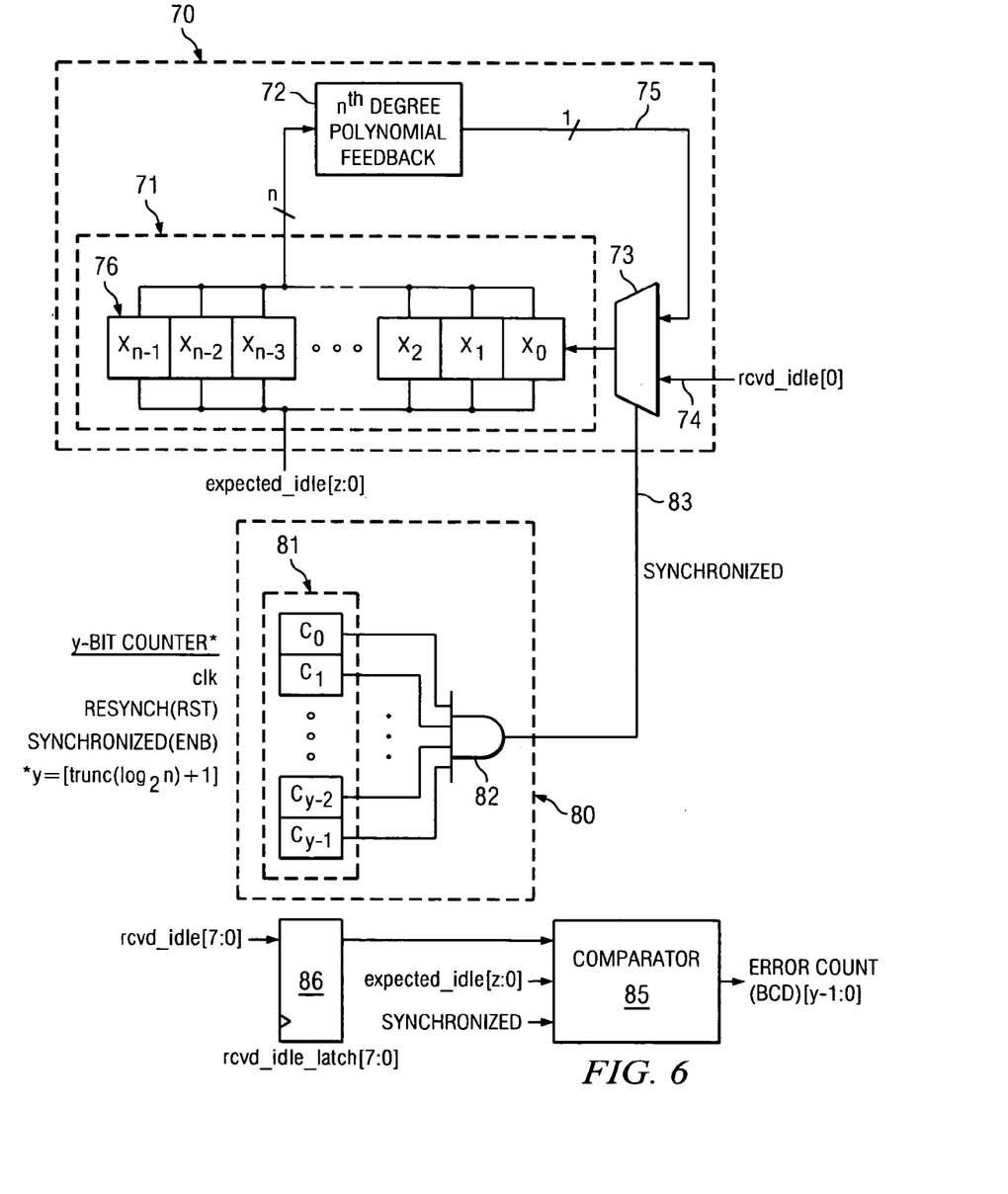
FIG. 6 is a functional block diagram of the linear feedback shift register, counter and comparator components of the receiving end of a communications link in one embodiment.

An alternative, generalized embodiment of the system is described below. Referring to FIG. 6, a functional block diagram of the linear feedback shift register, counter and comparator components of the receiving end of a communications link in one embodiment is shown. As depicted in this figure, linear feedback shift register 70 comprises shift register 71, feedback circuit 72 and demultiplexer 73. Counter 80 comprises bit registers 81 and AND gate 82. As idle codes are received via the transmission medium of the communications link, the least significant bit of each idle code is transmitted to demultiplxer 73 via line 74. Following a reset event, a "synchronized" signal is de-asserted on line 83 so that bits received via line 74 are fed into shift register 71. Each time a bit is received on line 74 following a reset event, counter 80 (which was cleared upon reset) is incremented. Thus, when shift register 71 is filled with bits received after the reset event, counter 80 is also filled and the "synchronized" signal is asserted on line 83. (Put another way, counter 80 counts the number of cycles it takes to load register 71 before asserting the "synchronized" signal). This causes the multiplexer to select line 75 for subsequent input. Then, on each succeeding clock signal, the output of circuit 72 is shifted into register 71. In other words, it begins operating as a linear feedback shift register.

It can be seen from FIG. 6 that, after n idle codes are received, shift register 71 will be filled. That is, each individual cell 76 of shift register 71 will contain a bit taken from one of the n idle codes. At this point, shift register 71 can begin to provide the n bits contained in shift register 71 to feedback circuit 72. Based upon these bits, circuit 72 will generate an nth degree polynomial. The least significant bit of this polynomial will, on the next clock cycle, be shifted into shift register 71.

Linear feedback shift register 70 is operationally identical to the linear feedback shift register employed by the transmitting end of the communications link. In other words, it is based upon the same polynomial and generates the same sequence of bits which are shifted through shift register 71. A subset of bits in the shift register of the transmitter are inserted into idle codes in the data stream transmitted to the receiver of the communications link. The subset of bits in shift register 71 should therefore match the bits received in the idle codes after linear feedback shift register 71 begins operation.

The registered idle codes and the bits in shift register 71 are transmitted to comparator 85. Comparator 85 makes a bitwise comparison of the two and thereby determines whether the received idle codes contain any errors. It should be noted that the received data should be latched for a cycle before being compared to the generated pseudorandom data. This function is performed by flip-flop 86. The "synchronized" signal of counter 80 is also input to comparator 85 so that no comparison will be made between the contents of shift register 71 and received idle codes until the shift register is filled. The error information generated by comparator 85 is then transmitted to circuitry (not shown) that calculates a bit error rate based upon the number of erroneous bits and the total number of bits examined. Because the idle codes are a normal part of the data transmission, the bit error rate can be calculated (in real-time) without adding any overhead to the transmitted data stream.

It should be noted that many variations of the elements of this linear feedback shift register are possible. For example, although the number of bits handled by the linear feedback shift register in a preferred embodiment is 11, other embodiments may use more or fewer bits to better suit the needs of a particular implementation. Similarly, the configurations of the counter and comparator could be adapted to the needs of a given implementation.

The various embodiments of the systems and methods described above may provide a number of advantages over other systems. For example, the receiving end of a communications link can be synchronized more quickly than systems which look for predetermined patterns in received bit sequences, or which look up received bit patterns in a corresponding table. The bit error rate of a communications link can also be determined in real-time by transmitting portions of a pseudorandom bit sequence in idle codes contained in normal data transmissions. These bit sequences can be compared with locally generated sequences to identify bit errors that occur during transmission. Users may therefore be able to continually monitor the integrity of the communications link and repair or replace it if necessary. The present systems and methods may also be beneficial in that they can be implemented with only minimal additions to the existing hardware logic, and no additional data overhead.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method comprising:

receiving one or more bits of synchronization data in a receiver of a communications link, wherein the synchronization data corresponds to at least one bit from a corresponding transmitter shift register;

loading the one or more bits of synchronization data into a shift register in the receiver, wherein the receiver shift register has a feedback circuit;

if the receiver shift register is filled with synchronization data, initiating synchronized operation of the receiver shift register with a corresponding transmitter shift register, wherein during synchronized operation, a bit sequence generated by the receiver shift register is compared to a received bit sequence to identify the occurrence of errors in a data transmission from the transmitter; and if the receiver shift register is not filled with synchronization data, shifting the loaded synchronization data and loading one or more additional bits of synchronization data into the receiver shift register.

2. The method of claim 1, wherein receiving one or more bits of synchronization data comprises receiving idle codes containing synchronization data.

3. The method of claim 1, further comprising determining whether the receiver shift register is filled with synchronization data by counting a predetermined number of cycles after a reset event.

4. The method of claim 1, wherein the receiver shift register comprises a plurality of serially coupled flip-flops, and wherein shifting the loaded synchronization data comprises shifting the bit in each flip-flop to a next flip-flop.

5. The method of claim 1, wherein loading the one or more additional bits of synchronization data into the receiver shift register comprises loading the one or more additional bits of synchronization data into one or more predetermined cells of the receiver shift register.

* * * * *